(12) United States Patent
Juang et al.

(10) Patent No.: US 11,424,620 B2
(45) Date of Patent: Aug. 23, 2022

(54) THREE-PHASE EXPANDABLE AC SYSTEM BASED ON BATTERY RECONFIGURATION AND CONTROL METHOD THEREOF

(71) Applicant: Industrial Technology Research Institute, Hsinchu (TW)

(72) Inventors: Kai-Cheung Juang, Hsinchu (TW); Chien-Yu Chen, Taipei (TW); Horng-Jzer Shih, Kaohsiung (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 315 days.

(21) Appl. No.: 16/727,891

(22) Filed: Dec. 26, 2019

(65) Prior Publication Data
US 2021/0126468 A1    Apr. 29, 2021

(30) Foreign Application Priority Data

Oct. 29, 2019   (TW) .................................. 108139099

(51) Int. Cl.
| | | |
|---|---|---|
| *H02J 3/46* | (2006.01) | |
| *H02J 7/00* | (2006.01) | |
| *H02J 3/06* | (2006.01) | |

(52) U.S. Cl.
CPC ............... *H02J 3/466* (2020.01); *H02J 3/06* (2013.01); *H02J 7/007* (2013.01); *H02J 7/0025* (2020.01)

(58) Field of Classification Search
CPC .. H02J 3/466; H02J 3/06; H02J 7/0025; H02J 7/007; H02J 3/32; H02J 2207/20;
(Continued)

(56) References Cited

U.S. PATENT DOCUMENTS

| 5,642,275 A | 6/1997 | Peng et al. |
|---|---|---|
| 6,459,596 B1 | 10/2002 | Corzine |

(Continued)

FOREIGN PATENT DOCUMENTS

| CN | 201774475 | 3/2011 |
|---|---|---|
| CN | 102013691 | 4/2011 |

(Continued)

OTHER PUBLICATIONS

Yeongrack Son, et al., "Direct Power Control of a Three-Phase Inverter for Grid Input Current Shaping of a Single-Phase Diode Rectifier With a Small DC-Link Capacitor", IEEE Transactions on Power Electronics, vol. 30, No. 7, Jul. 2015, pp. 3794-3803.

(Continued)

*Primary Examiner* — Lincoln D Donovan
*Assistant Examiner* — Alex W Lam
(74) *Attorney, Agent, or Firm* — JCIPRNET

(57) ABSTRACT

A three-phase expandable AC system based on battery reconfiguration and a control method thereof are provided. The system includes a reconfigurable battery array capable of connecting to a load or being tied to a grid, and having a plurality of battery array modules. The reconfigurable battery array may perform charging or discharging with respect to the load or the grid, and may perform one of operations including: generating a single-phase AC voltage corresponding respectively to outputs of the battery array modules; generating a three-phase AC voltage corresponding to three battery array modules selected from the plurality of battery array modules; and generating a plurality of three-phase AC voltages in parallel from the plurality of battery array modules, and merging the three-phase AC voltages in parallel to scale power.

16 Claims, 10 Drawing Sheets

(58) Field of Classification Search
CPC .................. H02J 7/0063; H02J 7/0013; H02J 2007/0067; H02J 7/00714; H02J 3/08; H02J 7/0024; H02M 7/49

See application file for complete search history.

(56) References Cited

U.S. PATENT DOCUMENTS

| | | | |
|---|---|---|---|
| 7,733,670 | B2 | 6/2010 | Feng et al. |
| 8,411,474 | B2 | 4/2013 | Roesner et al. |
| 8,958,221 | B2 | 2/2015 | Adam |
| 9,263,968 | B2 | 2/2016 | Potts et al. |
| 9,318,974 | B2 | 4/2016 | Yoscovich et al. |
| 9,701,208 | B2 | 7/2017 | Berger |
| 9,853,567 | B2 | 12/2017 | Flett |
| 9,917,445 | B2 | 3/2018 | West |
| 2012/0112547 | A1 | 5/2012 | Ghosh et al. |
| 2014/0028249 | A1 | 1/2014 | Larsen et al. |
| 2014/0036557 | A1 | 2/2014 | Nondahl et al. |
| 2014/0268959 | A1 | 9/2014 | Frohman et al. |
| 2014/0293667 | A1 | 10/2014 | Schroeder et al. |
| 2018/0309383 | A1 | 10/2018 | Wang et al. |
| 2018/0309384 | A1 | 10/2018 | Wang et al. |
| 2020/0119571 | A1* | 4/2020 | Taylor, Jr. ............ H02J 7/0024 |

FOREIGN PATENT DOCUMENTS

| | | |
|---|---|---|
| CN | 206323163 | 7/2017 |
| CN | 107103276 | 8/2017 |
| CN | 208754002 | 4/2019 |
| TW | 201125257 | 7/2011 |
| TW | I430557 | 3/2014 |

OTHER PUBLICATIONS

José Rodriguez, et al., "Multilevel Inverters: A Survey of Topologies, Controls, and Applications", IEEE Transactions on Industrial Electronics, vol. 49, No. 4, Aug. 2002, pp. 724-738.

Samuel Oludare Bamgbose, et al., "Three-phase Inverter Synchronization Control Utilizing Internal Model Principle", 2015 IEEE International Conference on Consumer Electronics (ICCE), Jan. 9, 2015, pp. 439-442.

J. Lee, et al., "Full Digital Control of Three-phase DC/AC Inverter", 8th International Conference on Power Electronics—ECCE Asia, May 30-Jun. 3, 2011, pp. 712-719.

Lena Makovenko, et al., "Modified DQ control approach for three-phase inverter", 2017 IEEE 58th International Scientific Conference on Power and Electrical Engineering of Riga Technical University (RTUCON), Oct. 2017, pp. 1-3.

Masoud Karimi-Ghartemani, et al., "Universal Controller for Three-Phase Inverters in a Microgrid", IEEE Journal of Emerging and Selected Topics in Power Electronics, vol. 4, No. 4, Dec. 2016, pp. 1342-1353.

"Office Action of Taiwan Counterpart Application", dated May 7, 2020, p. 1-p. 7.

* cited by examiner

THREE-PHASE EXPANDABLE AC SYSTEM BASED ON BATTERY RECONFIGURATION AND CONTROL METHOD THEREOF

CROSS-REFERENCE TO RELATED APPLICATION

This application claims the priority benefit of Taiwan application serial no. 108139099, filed on Oct. 29, 2019. The entirety of the above-mentioned patent application is hereby incorporated by reference herein and made a part of this specification.

TECHNICAL FIELD

The disclosure relates to a battery reconfiguration technique, and particularly relates to a three-phase expandable AC system based on battery reconfiguration.

BACKGROUND

In response to the trend of global climate change and demand for energy conservation and carbon reduction, and the gradual shortage of crude oil and other traditional energy sources in the future, development of renewable energy shows its importance and urgency. In order to solve the power shortage crisis, power storage systems are becoming more and more important, in which the battery is the most widely used energy storage device, even after 30 years, a proportion of the battery will probably surpass that of oil and coal and become the main power storage energy source in the world. In recent years, the energy storage systems have been regarded as important policies and actively developed. Power storage is a new industry, and in recent years, under the strategic promotion of governments in various countries, along with the fact that renewable energy has reached saturation in many countries to cause problems in the power system, the demand for power storage systems is gradually sprouting.

In the power system, regardless of a power generation end, a transmission end, a distribution end, and a power consumption end, there is a need to store electricity, where the energy may be stored in an off-peak time, and when electricity is needed, the electricity is transmitted to various families through a power grid. How today's new technology sends electricity back to the power grid through energy/electricity storage system will gradually become a new issue in the power electronics industry. Such technology will be widely used in power storage systems.

At the present stage, design of a renewable energy system generally focuses on efficiency and price of batteries and modules. However, along with popularity and maturity of the system, the renewable energy system has reached a bottleneck, and in order to continuously improve the efficiency and practicability of power management, design of a converter module behind battery modules plays an important role. Therefore, if the overall system design may be more completely considered, this system may also be applied to an electric vehicle charging and replacing system, and the best treatment may be done for the vehicle's second-life batteries.

In addition, as the issue of green energy and environmental protection is becoming more and more important, energy storage power plants and industries of electric vehicle and electric motor vehicle continue to flourish. However, the demand for batteries of the two industries is quite large. Lithium battery is widely used nowadays, and its advantages will drive the lithium battery to comprehensively replace lead-acid battery in the future. Along with popularization of cloud computing application and network storage devices, battery reconfiguration systems have been adopted to construct battery modules of an energy array in order to improve the endurance. A high output voltage of the battery reconfiguration system requires addition of a newer and more complex control strategy. Therefore, the battery reconfiguration system must require a battery management system and a power conversion system in collaboration with a battery switching module (an enable mode or a bypass mode) to maintain the optimal application state of the system in order to maximize energy efficiency.

SUMMARY

Based on the above, an embodiment of the disclosure provides a three-phase expandable AC system based on battery reconfiguration, which includes a reconfigurable battery array capable of connecting to a load or being tied to a grid, and having a plurality of battery array modules. The reconfigurable battery array performs discharging to the load or the grid, or makes the load or the grid perform charging to the reconfigurable battery array. The reconfigurable battery array performs one of operations including: respectively generating a single-phase AC voltage corresponding to outputs of the battery array modules; selecting three from the battery array modules to generate a corresponding three-phase AC voltage; and generating a plurality of three-phase AC voltages from the battery array modules, and merging the three-phase AC voltages in parallel to scale power.

According to an embodiment, generating the single-phase AC voltage includes: AC synthesis directly corresponding to different AC voltages at a user end, and performing battery configuration control on each of the battery array modules to generate a multi-level DC voltage; superimposing the multi-level DC voltage with a compensated current command to generate a full-wave DC signal; and converting the full-wave DC signal into the single-phase AC voltage through a polarity converter, where the voltage is scalable and corresponds to different AC voltages, and is adapted to achieve bi-direction charging and discharging.

According to an embodiment, when the reconfigurable battery array is a stand along type reconfigurable battery array, generating the three-phase AC voltage includes: selecting one of three corresponding single-phase AC voltages generated by the selected three battery array modules as a master single-phase AC voltage, and taking the other two as slave single-phase AC voltages; taking a phase of the master single-phase AC voltage as a reference, and making phases of the two slave single-phase AC voltages respectively ahead and behind the phase of the master single-phase AC voltage, so as to generate the three-phase AC voltage that is independently operated; and providing the three-phase AC voltage to the load, or tying the three-phase AC voltage to the grid.

According to an embodiment, when the reconfigurable battery array is a grid-tied type reconfigurable battery array, generating the three-phase AC voltage includes: taking three corresponding single-phase AC voltages generated by the selected three battery array modules as three slave single-phase AC voltages; and respectively synchronizing with three phases of the grid to tie the three single-phase AC voltages to the grid.

According to an embodiment, the battery array modules respectively include: a plurality of battery modules; a current mode switch converter, which is connected to one end of the battery modules, receives a current command, and controls the battery array module to perform the charging or the discharging; and a battery configuration control portion, which is connected to the battery modules, and configured to set each of the battery modules to an enable mode or a bypass mode according to a required voltage output.

According to an embodiment, the battery modules are arranged to be connected in series and parallel to form the battery array module. In an embodiment, each of the battery array modules includes a plurality of battery modules, and the battery modules are respectively second-life batteries.

According to an embodiment, a specification of each of the battery modules is the same or different.

According to an embodiment, the reconfigurable battery array directly outputs a DC voltage as required.

Another embodiment of the disclosure provides a control method of a three-phase expandable AC system based on battery reconfiguration. The three-phase expandable AC system based on battery reconfiguration includes a reconfigurable battery array capable of connecting to a load or being tied to a grid, and the reconfigurable battery array has a plurality of battery array modules. The control method includes: performing discharging to the load or the grid by the reconfigurable battery array, or making the load or the grid perform charging to the reconfigurable battery array. The reconfigurable battery array performs one of operations including: respectively generating a single-phase AC voltage corresponding to outputs of the battery array modules; selecting three from the battery array modules to generate a corresponding three-phase AC voltage; and generating a plurality of three-phase AC voltages from the battery array modules, and merging the three-phase AC voltages in parallel to scale power.

According to an embodiment, generating the single-phase AC voltage includes: performing battery configuration control on each of the battery array modules to generate a multi-level DC voltage; superimposing the multi-level DC voltage with an output signal generated by a compensated current command to generate a full-wave DC signal; and performing polarity conversion to convert the full-wave DC signal into the single-phase AC voltage.

According to an embodiment, when the reconfigurable battery array is a stand along type reconfigurable battery array, generating the three-phase AC voltage further includes: selecting one of three corresponding single-phase AC voltages generated by the selected three battery array modules as a master single-phase AC voltage, and taking the other two as slave single-phase AC voltages; taking a phase of the master single-phase AC voltage as a reference, and making phases of the two slave single-phase AC voltages respectively ahead and behind the phase of the master single-phase AC voltage, so as to generate the three-phase AC voltage that is independently operated; and providing the three-phase AC voltage to the load, or tying the three-phase AC voltage to the grid.

According to an embodiment, when the reconfigurable battery array is a grid-tied type reconfigurable battery array, generating the three-phase AC voltage further includes: taking three corresponding single-phase AC voltages generated by the selected three battery array modules as three slave single-phase AC voltages; and respectively synchronizing with three phases of the grid to tie the three single-phase AC voltages to the grid.

According to an embodiment, the reconfigurable battery array performs the discharging or the charging based on a current command.

According to an embodiment, each of the battery array modules includes a plurality of battery modules, the battery modules are respectively second-life batteries. According to an embodiment, a specification of each of the battery modules is the same or different.

According to an embodiment, the reconfigurable battery array directly outputs a DC voltage as required.

According to an embodiment, the battery modules are arranged to be connected in series and parallel to form the battery array module.

Based on the above description, the battery modules of the disclosure use the reconfigurable battery unit, which are compatible with any existing battery module, and are adapted to directly synthesize a required voltage, current, even single-phase alternating current, three-phase alternating current, and may be tied to a grid for power scale, and are suitable for high-power applications of large voltage and large current. The disclosure directly synthesizes the AC signals, which effectively improves the conversion efficiency, and due to a small to large hierarchical structure, component stress is reduced, thereby reducing the cost.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
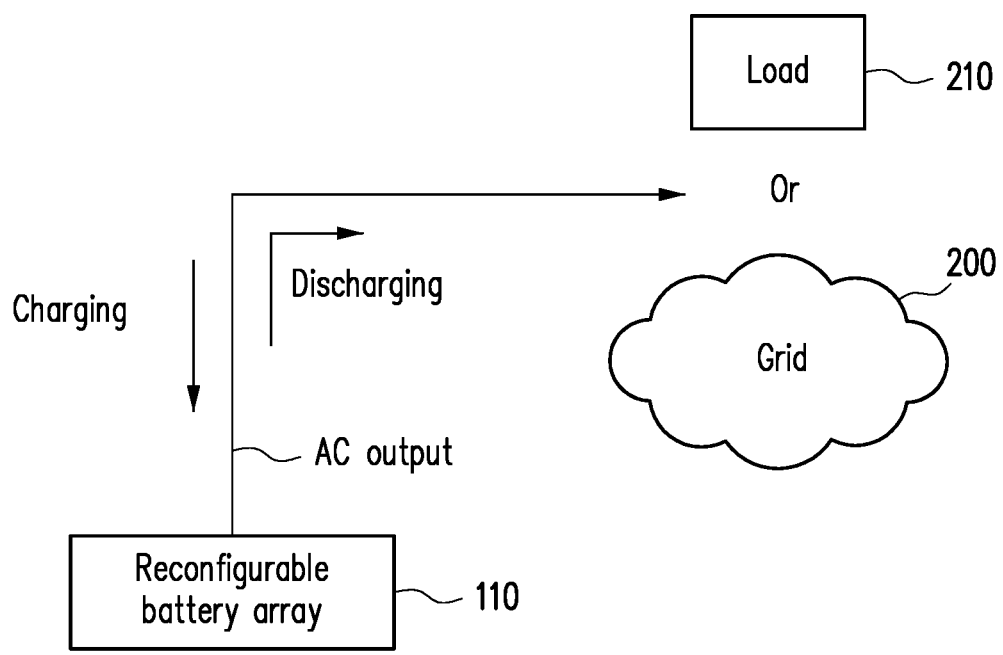
FIG. 1 is a schematic diagram of a three-phase expandable AC system based on battery reconfiguration according to an embodiment of the disclosure.

FIG. 1 is a schematic diagram of a three-phase expandable AC system based on battery reconfiguration according to an embodiment of the disclosure. As shown in FIG. 1, the three-phase expandable AC system based on battery reconfiguration (which is referred to as the system thereinafter) 100 at least includes a reconfigurable battery array 110. The reconfigurable battery array 110 may be connected to a load 210 or tied to a grid 200. In other words, the reconfigurable battery array 110 of the embodiment may be a stand along type reconfigurable battery array, which may output a single-phase AC voltage, a three-phase AC voltage, or only output a required DC voltage. Moreover, the reconfigurable battery array 110 may also be a grid-tied type reconfigurable battery array, and under such configuration, the reconfigurable battery array 110 may be connected to the grid 200. Under the grid-tied state, electric power generated by the reconfigurable battery array 110 may be fed into the grid 200, i.e. discharged to the grid 200, or the grid 200 may charge the reconfigurable battery array 110. The grid 200 may be referred to a smart grid or a general grid.

Moreover, the reconfigurable battery array 110 may also be connected to the load 210 to supply power to the load 210. The load 210 may be, for example, a motor of an electric car, a car, etc. Motor operation usually requires AC voltage, and the reconfigurable battery array 110 may synthesize the required AC voltage to the load 210. Moreover, the supplied AC voltage can be a single-phase or three-phase AC voltage as required. Similarly, the reconfigurable battery array 110 may provide power to the load 210, i.e. discharge to the load 210, and the load 210 can also charge the reconfigurable battery array 110.

The so-called charge or energy storage herein refers to the charging of the reconfigurable battery array 110, i.e. energy storage, when there is excess electric energy in the grid 200 or the load 210. In this case, the grid 200 or the load 210 first converts a three-phase alternating current to a single-phase alternating current, and then converts to a direct current to charge the battery modules in the reconfigurable battery array 110. Conversely, the so-called discharge or energy conversion refers to that the excessive electric energy of the reconfigurable battery array 110 may be provided to the grid 200 or the load 210, i.e. discharged to the grid 200 or the load 210, which is energy conversion. In this case, the reconfigurable battery array 110 may first convert the direct current to the single-phase alternating current, and then convert to the three-phase alternating current to discharge to the grid 200 or the load 210.

Moreover, the reconfigurable battery array 110 is composed of a plurality of battery array modules, and each of the battery array modules is formed by connecting a plurality of battery modules in series or in series and in parallel. Through a control signal, the number and connecting method of the used battery modules may be selected to cope with a required output voltage (which is described in detail later). The number of the battery modules of each of the battery array module is not particularly specified. Moreover, the battery module is basically a battery that outputs a DC voltage. Each of the battery modules may have the same specification (such as the output voltage, current, etc.) and is new, or is a second-life battery, and the specification of each of the battery modules may also be different. Besides general batteries that may generate direct current, renewable energy sources such as solar cells or wind power may also generate direct current, so that they may also be used as the battery modules.

Therefore, through the embodiment, each battery module string may synthesize the required voltage. Through the serial connection of the battery modules, different output voltages may be synthesized without an additional voltage conversion circuit, so that energy saving is achieved and fine voltage adjustment may be performed.

Through the aforementioned structure, the reconfigurable battery array 110 of the disclosure may perform voltage scaling on the output voltage, convert the single-phase AC voltage to the three-phase AC voltage, and the generated three-phase AC voltage may be tied to the grid, and by tying a plurality of the reconfigurable battery arrays 110 to the grid, power scaling may be implemented.

Therefore, according to the three-phase expandable AC system based on battery reconfiguration of the embodiment, the reconfigurable battery array 110 may execute one of following operation: respectively generating a single-phase AC voltage corresponding to outputs of the battery array modules; selecting three from the battery array modules to generate a corresponding three-phase AC voltage; and generating a plurality of three-phase AC voltages from the battery array modules, and merging the three-phase AC voltages in parallel to scale power. Namely, the three-phase expandable AC system based on battery reconfiguration of the embodiment is a system framework integrating energy storage and energy conversion. Then, detailed operation of each of the above points will be explained one by one.

Reconfigurable Battery Array and Voltage Adjustment

Figure 2:
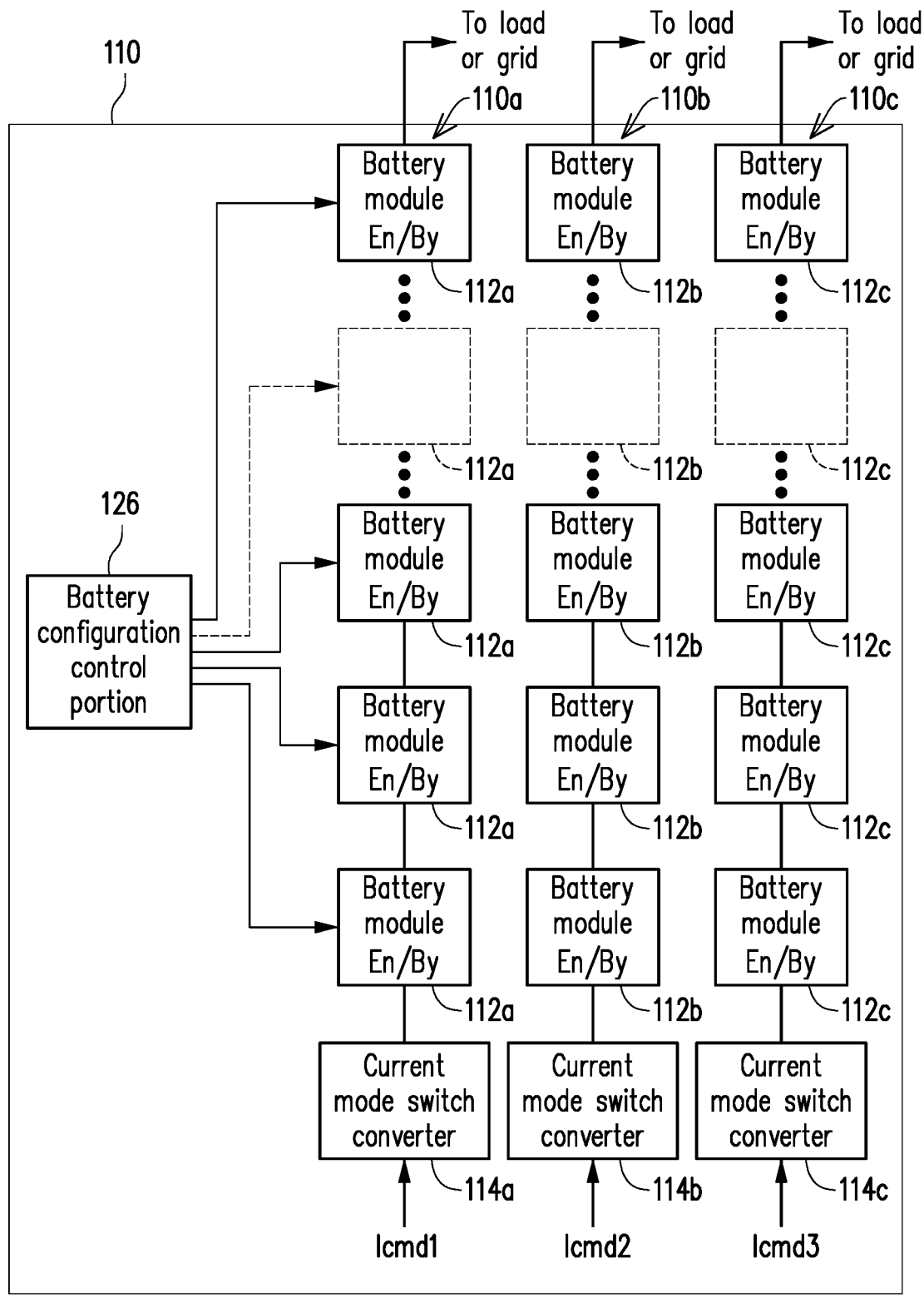
FIG. 2 is a schematic diagram of a framework of a reconfigurable battery array according to the embodiment.

First, the reconfigurable battery array of the embodiment of is described. FIG. 2 is a schematic diagram of a framework of a reconfigurable battery array according to the embodiment. As shown in FIG. 2, the reconfigurable battery array may include a plurality of battery array modules, and three battery array modules 110a, 110b, 110c are taken as an example for description, and each of the battery array modules 110a, 110b, 110c respectively include a plurality of battery modules 112a, 112b, 112c. Each of the battery array modules 110a, 110b, 110c is respectively connected to a current mode switch converter 114a, 114b, 114c. Taking the current mode switch converter 114a as an example, the current mode switch converter 114a receives a current command Icmd1 to control charging or discharging of the battery array module 110a. The current command may be a Pulse Width Modulation (PWM) signal.

Moreover, the reconfigurable battery array 110 further includes at least one battery configuration control portion 126. The battery configuration control portion 126 outputs a control command according to a demand of the output voltage to control a connection configuration of the battery modules of the reconfigurable battery array 110. Moreover, the battery configuration control portion 126 may control all of the battery module strings in the reconfigurable battery array 110, or each of the battery array modules 110a, 110b, 110c may correspond to one battery configuration control portion 126.

Figure 3A:
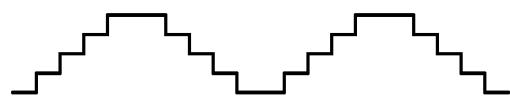
FIGS. 3A-3D are waveform variation diagrams of an AC voltage generated by a DC voltage according to the embodiment.
Figure 3B:
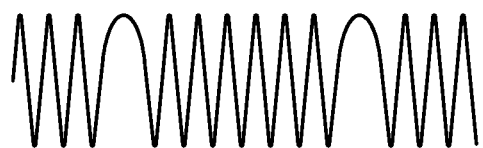
Figure 3C:
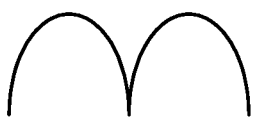
Figure 3D:
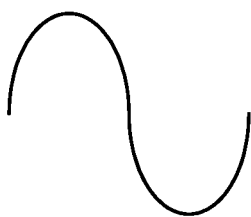

Moreover, as shown in FIGS. 3A-3D, the battery configuration control portion 126 controls the connection configuration of the battery modules of the reconfigurable battery array 110 to generate a corresponding multi-level signal (DC, for example, an output voltage of the battery modules 112a) shown in FIG. 3A, and then the multi-level signal is superimposed to an output signal (FIG. 3B) generated by the current command to generate a full-wave signal (FIG. 3C). Then, the full-wave signal is converted into a single-phase AC voltage (FIG. 3D) by a polarity converter (not shown).

For example, the battery configuration control portion 126 outputs a control command to the battery array module 110a according to the demand of the output voltage, and each of the battery modules 112a in the battery array module 110a may be set to an enable mode (En) or a bypass mode (By), the required output voltage may be synthesized by setting each of the battery modules 112a to the enable mode or the bypass mode. Therefore, according to the embodiment, by controlling each of the battery modules to be in the enable mode or the bypass mode, the required voltage may be easily synthesized without using a complicated voltage conversion circuit.

Moreover, in the above description, although a plurality of battery modules are illustrated as being connected in series to form a battery array module, the battery array module may also construct a battery array by connecting a plurality of battery modules in series and in parallel. Similarly, the battery configuration control portion 126 may control each of the battery modules in the battery array module to be in the enable mode or the bypass mode. Generally, when a large voltage is required, it may be realized by connecting a plurality of battery modules in series, and when a large current is required, it may be realized by connecting a plurality of battery modules in parallel.

Then, the current mode switch converter 114 uses a current command to control the battery array module, especially control a charging and discharging effect of the reconfigurable battery array 110. Generally, an adjustable range of the output voltage of the reconfigurable battery array 110 is not large, and if a voltage difference between the reconfigurable battery array 110 and the grid 200 serving as a tying object is small, the two-way operation of charging and discharging may not be easy. Therefore, the current command may be used for controlling. In this way, the reconfigurable battery array 110 may be effectively controlled to discharge to the grid 200 or the load 210, or the grid 200 or the load 210 may charge the reconfigurable battery array 110. Therefore, according to the embodiment, the current command of the current mode switch converter 114 may be used to implement the two-way operation of charging and discharging of the reconfigurable battery array 110, so as to achieve energy storage and conversion of the reconfigurable battery array 110.

Moreover, in addition to being used to control the charging and discharging of the reconfigurable battery array 110, the current command may also be used to compensate the output voltage of the reconfigurable battery array 110, so that the signal quality of the AC voltage synthesized by the reconfigurable battery array 110 is better. For example, the output voltage of the reconfigurable battery array 110 may be transmitted to a control circuit, and the control circuit performs the error compensation. Then, the current command is generated to the current mode switch converters 114a, 114b, 114c, etc., so as to compensate the output voltage of the reconfigurable battery array 110 (which is described later).

As described above, the reconfigurable battery array 110 of the embodiment is basically a hierarchical structure, so the reconfigurable battery array 110 may synthesize the required single-phase AC voltage according to the required voltage. Moreover, when the reconfigurable battery array 110 is connected to the load 210 or the grid 200, the current mode switch converters may be used to control the reconfigurable battery array 110 to perform charging or discharging operation (energy storage, energy conversion) to achieve the two-way operation. Moreover, if the DC voltage is required, the reconfigurable battery array 110 may directly output the DC voltage without converting the DC voltage into the AC voltage.

Single-Phase AC Voltage to Three-Phase AC Voltage Conversion

The reconfigurable battery array 110 of the embodiment may synthesize the single-phase AC voltage generated by each of the battery array modules 110a, 110b and 110c to generate a three-phase AC voltage. Moreover, the above generated three-phase AC voltage may be tied to the grid 200, or may be connected to the load (for example, a motor) requiring the three-phase AC voltage. Generally, the grid 200 is the three-phase AC voltage, so that the single-phase AC voltage generated by each of the battery array modules in the reconfigurable battery array 110 is required to be first converted into the three-phase AC voltage. Then, the operation of converting the single-phase AC voltage into the three-phase AC voltage of the embodiment is described below.

When the reconfigurable battery array 110 is tied to the grid 200, the reconfigurable battery array 110 has two types, one is a stand along type, i.e., the reconfigurable battery array 110 and the grid 200 are independent without a connection. Another one is a grid-tied type, i.e., the reconfigurable battery array 110 is tied to the grid 200. The stand along type is first introduced below.

Figure 4:
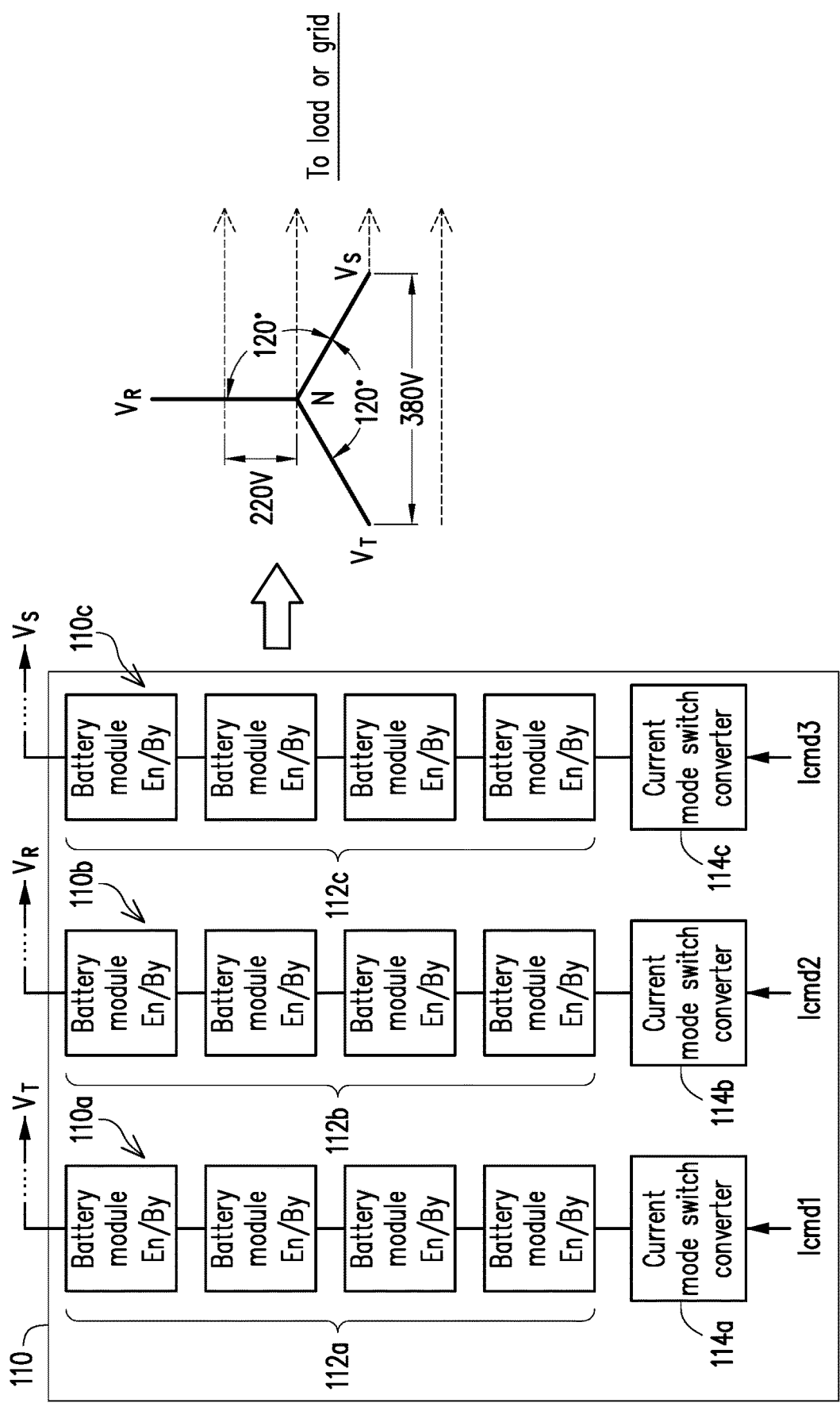
FIG. 4 illustrates a method that a reconfigurable battery array generates a three-phase AC voltage according to the embodiment.

FIG. 4 illustrates a method that the reconfigurable battery array generates a three-phase AC voltage according to the embodiment. In the embodiment, the reconfigurable battery array 110 may include a plurality of battery array modules. When a three-phase AC voltage is to be generated, three of the battery array modules may be selected from the plurality of battery array modules, for example, the battery array modules 110a, 110b, 110c shown in FIG. 4. The battery array modules 110a, 110b, 110c may respectively generate single-phase AC voltages $V_T$, $V_R$, $V_S$ according to the aforementioned method, and voltage magnitudes thereof may be 110V, 220V or other voltage magnitude to be tied to the grid. Then, the three single-phase AC voltages $V_T$, $V_R$, $V_S$ are synchronized. After the synchronization, one of the single-phase AC voltage $V_T$ is selected as a master, i.e., serves as a phase reference value. Then, one of the remained single-phase AC voltage $V_R$ is taken as a slave, and the current command makes a phase of the single-phase AC voltage $V_R$ 120 degrees ahead of a phase of the single-phase AC voltage $V_T$. Thereafter, the remained single-phase AC voltage $V_S$ is taken as the slave, and the current command makes a phase of the single-phase AC voltage $V_S$ 120 degrees behind the phase of the single-phase AC voltage $V_T$. In this way, sine waves of the three single-phase AC voltages $V_T$, $V_T$, $V_S$ may produce a set of three-phase AC voltage. The three-phase AC voltage may be transmitted to the load such as a motor, etc.

Moreover, if the reconfigurable battery array 110 is the grid-tied type reconfigurable battery array, i.e. the reconfigurable battery array 110 is connected to the grid 200. In this case, the grid 200 has a three-phase AC voltage, and the single-phase AC voltages generated by the reconfigurable battery array 110 substantially have the same phase as that of the grid 200. Namely, in this case, the single-phase AC voltages generated by the reconfigurable battery array 110 do not require phase adjustment. At this point, the three single-phase AC voltages are directly selected as the slaves, and then the three phases are synchronized relative to the grid.

Power Scale

According to the embodiment, the reconfigurable battery array 110 may perform power scale. In FIG. 4, only three battery array modules 110a, 110b, 110c are illustrated to describe how to convert the three single-phase AC voltages into the three-phase AC voltage. When the reconfigurable battery array 110 includes a plurality of battery array modules, every three battery array modules may produce one three-phase AC voltage. By connecting a plurality of three-phase AC voltages in parallel, power scale is implemented. Moreover, when the power is scaled, one of a plurality of sets of three-phase AC voltages may be selected as a master, and the other sets of three-phase AC voltage are accordingly connected in parallel to achieve power scale.

Similar to the single-phase AC voltage mentioned above, the above power scale is also adapted to the reconfigurable battery array 110 of the stand along type or the grid-tied type, and a basic operation mode thereof is the same as that of the single-phase AC voltage, which is not repeated.

Figure 5:
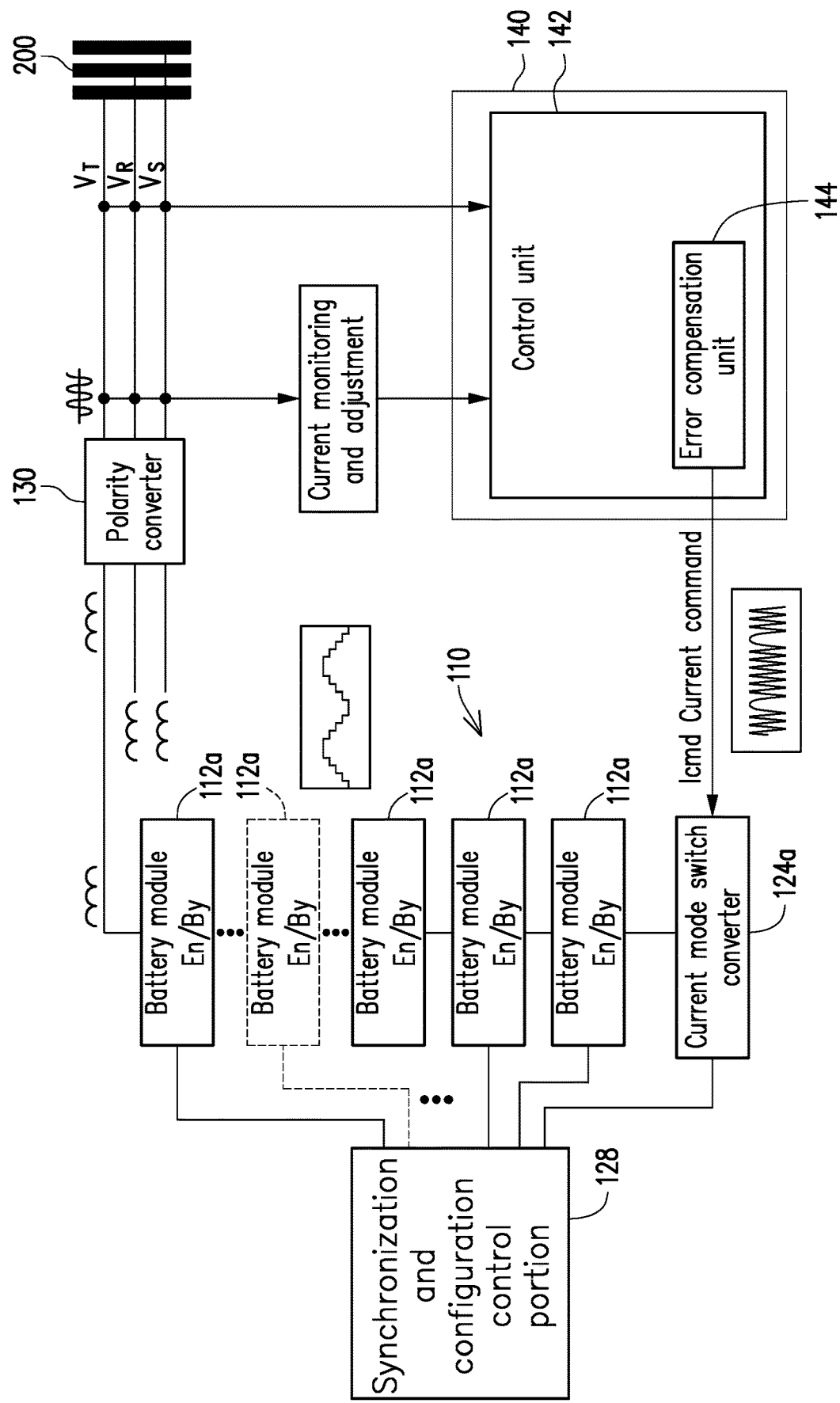
FIG. 5 is a block diagram of a three-phase expandable AC system based on battery reconfiguration.

FIG. 5 is a block diagram of a three-phase expandable AC system based on battery reconfiguration. As shown in FIG. 5, the three-phase expandable AC system includes the reconfigurable battery array 110, a control portion 140 and the grid 200 (which may also be the load 210 of FIG. 1), and the following introduction is made based on the grid 200.

Each of the battery array modules of the reconfigurable battery array 110 is connected to the grid 200 through a polarity converter 130. The reconfigurable battery array 110 may include a plurality of battery array modules, and for simplicity's sake, only one battery array module 110a is illustrated. Similar as that shown in FIG. 2, the output of the battery array module 110a may be converted into the single-phase AC voltage through the polarity converter 130. Taking three single-phase AC voltages $V_T$, $V_R$, $V_S$, according to the method shown in FIG. 4, a three-phase AC voltage may be generated, and is tied to the grid 200 (either the stand along type or the grid-tied type).

Moreover, a framework and an operation method of the battery array modules of the reconfigurable battery array 110 are the same as that shown in FIG. 2, for example, the battery array module 110a includes a plurality of battery modules 112a, and the battery modules are connected to the current mode switch converter 124a for receiving the current command Icmd of the PWM signal. The current command Icmd may control the battery array module 110a to discharge to the grid 200 or make the grid 200 charge the battery array module 110a.

Moreover, the current mode switch converter 124a is further connected to the control portion 140, and the control portion 140 may accordingly control all functions and operations of the system, and FIG. 5 only illustrates a required part of the description. A core of the control portion 140 is a control unit 142, which is, for example, a Digital Signal Processor (DSP). The control unit 142 may receive the single-phase AC voltages and the three-phase AC voltage generated by a plurality of the battery array modules, and use an error compensation unit 144 to implement feedback, and the error compensation unit 144 may accordingly generate the corrected current command Icmd. Through the corrected current command Icmd, the quality of the output signal of the battery array module 110a may be improved.

Moreover, the battery array module 110a may further include a synchronization and configuration control portion 128. The synchronization and configuration control portion 128 is connected to each of the battery modules 112a, and may set each of the battery modules to the enable mode (En) or the bypass mode (By), so as to synthesize a required voltage. Moreover, the synchronization and configuration control portion 128 of FIG. 5 further includes a synchronization mechanism. Description of FIG. 2 may be referred for the serial-parallel connection method of each of the battery modules 112a.

Figure 6A:
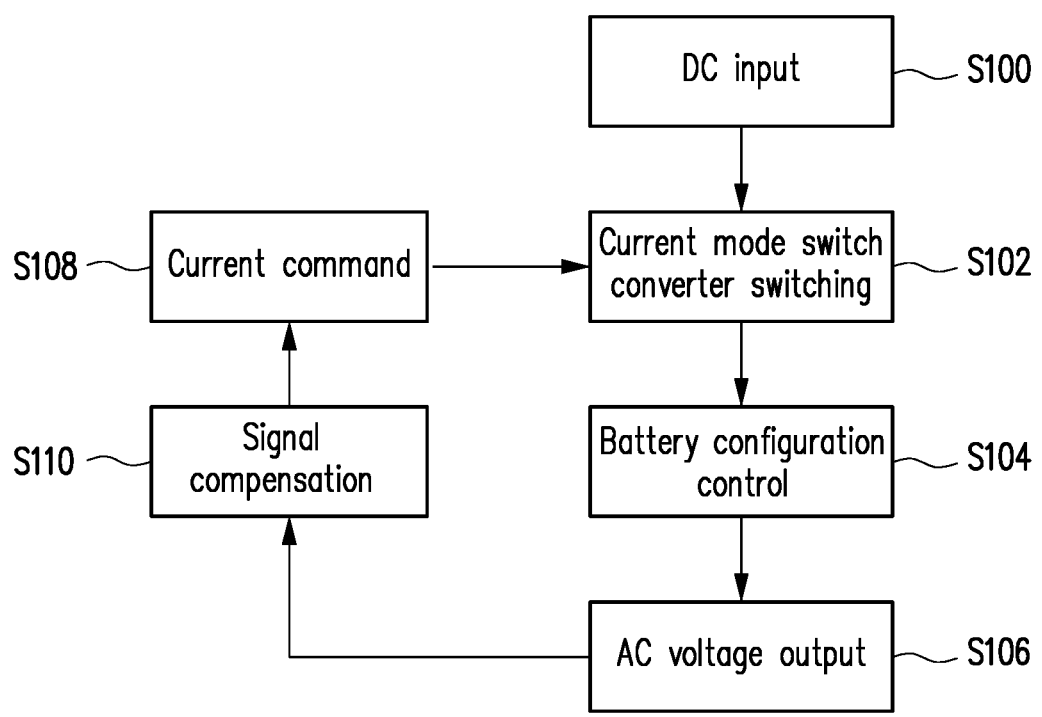
FIG. 6A is a flowchart illustrating a process that the reconfigurable battery array generates a single-phase AC voltage according to the embodiment.

FIGS. 6A-6D are flowcharts illustrating voltage adjustment of the reconfigurable battery array, single-phase AC voltage to three-phase AC voltage conversion and power scale according to an embodiment of the disclosure. Referring to FIGS. 6A-6D and FIGS. 2 and 3 for description, FIG. 6A is a flowchart illustrating a process that the reconfigurable battery array generates a single-phase AC voltage according to the embodiment. Taking the battery array module 110a of FIG. 2 as an example, in a step S100, a DC signal is input to the battery array module 110a of the reconfigurable battery array. Then, in a step S108, a current command is provided to the current mode switch converter 114a, and the current command may control the battery array module 110a to perform energy storage (charging) or energy conversion (discharging), and may control the quality of the output signal of the battery array module 110a. In a step S104, battery configuration control is performed. The battery configuration control portion 126 may set each of the battery modules on a battery path of the battery array module 110a to the enable mode (En) or the bypass mode (By) to synthesize a required voltage. Thereafter, the voltage is converted by a polarity converter to generate an AC voltage, and finally a single-phase AC voltage is output (step S106). In other words, the battery configuration control is performed to each of the battery array modules to generate a multi-level DC voltage. Thereafter, the multi-level DC voltage is superimposed to an output signal generated by the current command to generate a full-wave DC signal. Finally, the polarity converter converts the full-wave DC signal into the single-phase AC voltage.

Moreover, the single-phase AC voltage output by the step S106 may be fed back, and through signal compensation of a step S110, the new current command is generated in the step S108, and is then provided to the current mode switch converter 114a to control the signal quality.

Figure 6B:
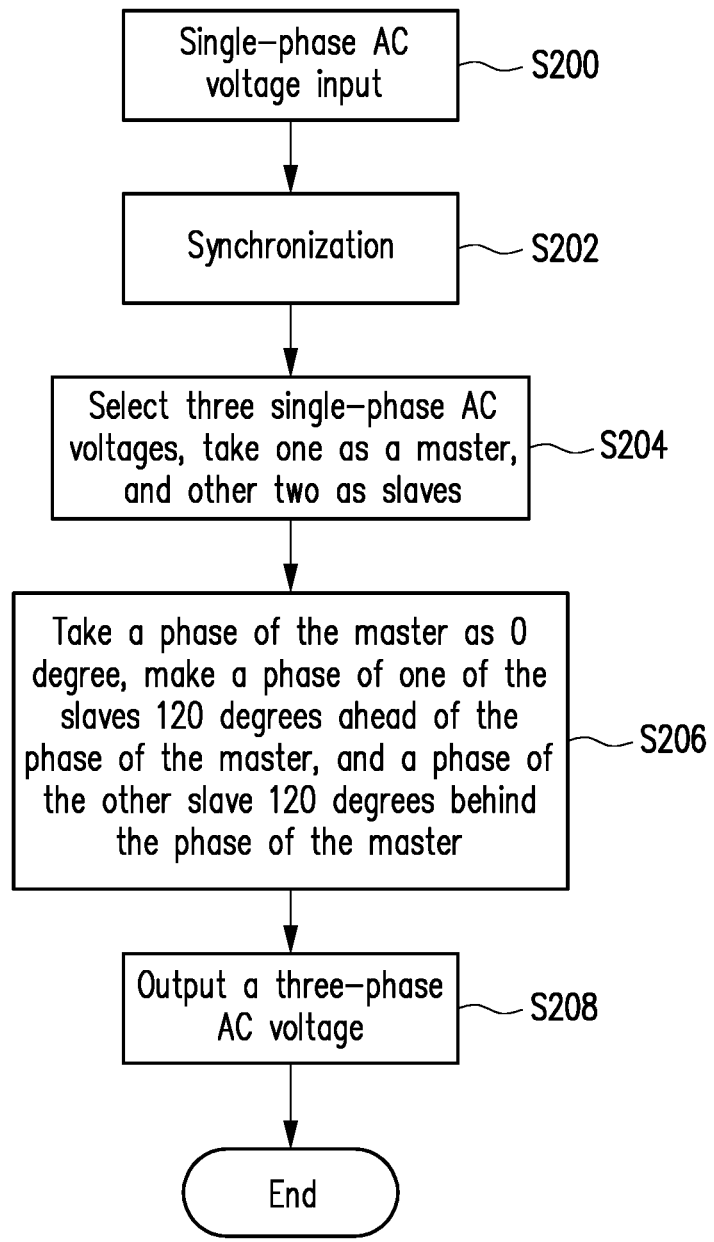
FIG. 6B is a flowchart illustrating a single-phase AC voltage to three-phase AC voltage conversion of a stand along type reconfigurable battery array according to the embodiment.

FIG. 6B is a flowchart illustrating a single-phase AC voltage to three-phase AC voltage conversion of the stand along type reconfigurable battery array according to the embodiment. Similarly, taking the battery array modules 110a, 110b, 110c of FIG. 2 and FIG. 3 as an example, the reconfigurable battery array 110 may include a plurality of battery array modules. In a step S200, single-phase AC voltages are input (selected), and the single-phase AC voltages may be generated according to the method shown in FIG. 6A and FIG. 2. Thereafter, in a step S202, three single-phase AC voltages are synchronized. In a step S204, one single-phase AC voltage is selected from the three single-phase AC voltages as a master and the other two single-phase AC voltages serve as slaves. Then, in a step S206, a phase of the master single-phase AC voltage is taken as 0 degree, and a phase of one of the salve single-phase AC voltages is 120 degrees ahead of the phase of the master single-phase AC voltage, and a phase of the other slave single-phase AC voltage is 120 degrees behind the phase of the master single-phase AC voltage. In this way, in a step S208, the three single-phase AC voltages are converted into one three-phase AC voltage.

The three-phase AC voltage generated through the above flow may be provided to the load 210 or tied to the grid 200 shown in FIG. 1. Moreover, after the three-phase AC voltage is provided to the load 210 or tied to the grid 200, the reconfigurable battery array 110 may discharge to the load 210 or the grid 200, or the load 210 or the grid 200 may charge the reconfigurable battery array 110 under control of the current command provided to the current mode switch converter 114a.

Figure 6C:
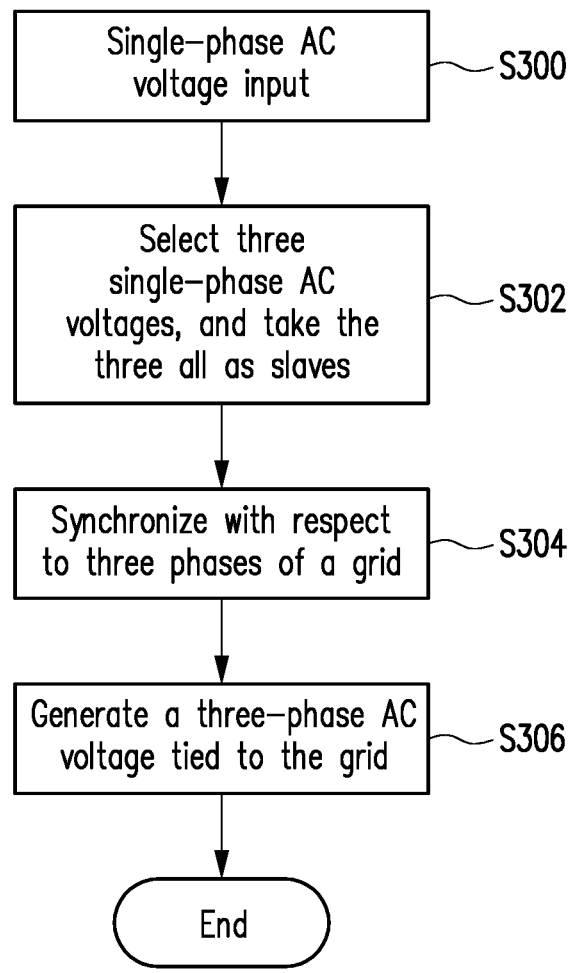
FIG. 6C is a flowchart illustrating a single-phase AC voltage to three-phase AC voltage conversion of a grid-tied type reconfigurable battery array according to the embodiment.

FIG. 6C is a flowchart illustrating a single-phase AC voltage to three-phase AC voltage conversion of the grid-tied type reconfigurable battery array according to the embodiment. Similarly, taking the battery array modules 110a, 110b, 110c of FIG. 2 and FIG. 4 as an example, as described above, a difference between the stand along type and the grid-tied type reconfigurable battery array is that the grid-tied type reconfigurable battery array has been tied to the grid, so that it is unnecessary to take one of the three single-phase AC voltages as the master to perform the phase adjustment on each phase of the three-phase AC voltage. In a step S300, single-phase AC voltages are input (selected), and the single-phase AC voltages may be generated according to the method shown in FIG. 6A and FIG. 2. Thereafter, in a step S302, the selected three single-phase AC voltages are all taken as slaves (relative to the grid). Then, in a step S304, the three single-phase AC voltages are synchronized with respect to three phases of the grid. In a step S306, the three-phase AC voltage tied to the grid is generated. Similarly, after being tied to the grid 200, the reconfigurable battery array 110 may discharge to the grid 200, or the grid 200 may charge the reconfigurable battery array 110 under control of the current command provided to the current mode switch converter 114a.

Figure 6D:
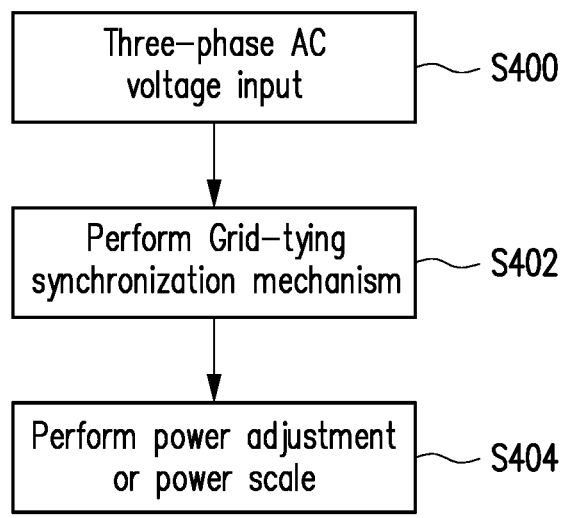
FIG. 6D is a flowchart illustrating power scale of a plurality of three-phase AC voltages generated by the reconfigurable battery array according to the embodiment.

FIG. 6D is a flowchart illustrating power scale of a plurality of three-phase AC voltages generated by the reconfigurable battery array according to the embodiment. As shown in FIG. 6D, in a step S400, a plurality of three-phase AC voltages is obtained. For example, the reconfigurable battery array 110 may include a plurality of battery array modules, and each time three battery array modules are used to synthesize one three-phase AC voltage, and a plurality of three-phase AC voltages is generated according to such method. The generation method of the three-phase AC voltages is shown in FIG. 6B or FIG. 6C and the above descriptions. Thereafter, in steps S402, S404, the three-phase AC voltages are tied to the grid, and the quantity of the three-phase AC voltages to be tied to the grid is selected based on the required power. In this way, the power may be easily scaled as required.

Figure 7:
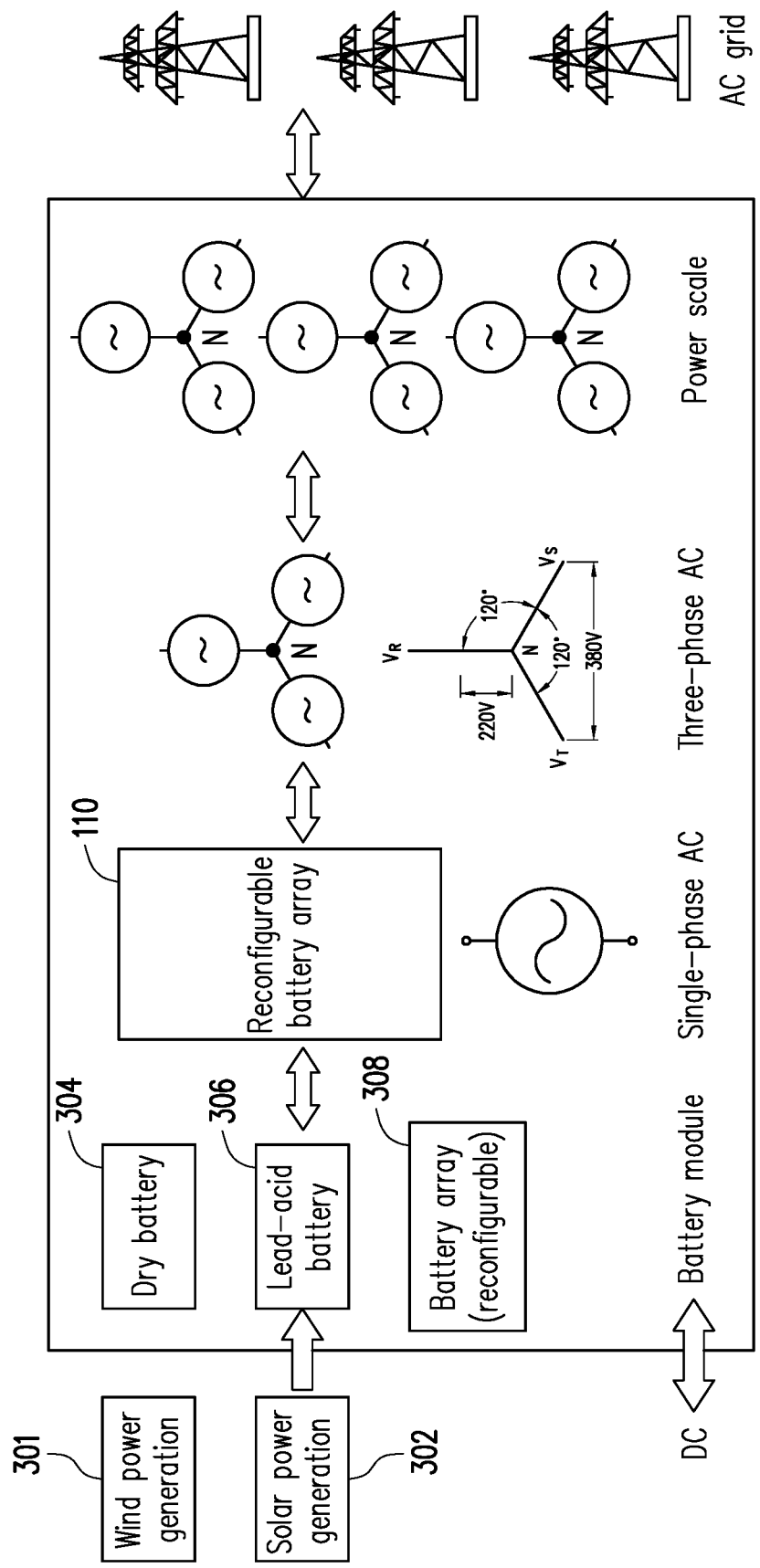
FIG. 7 is an introduction of application of the embodiment.

FIG. 7 is an introduction of application of the embodiment. As shown in FIG. 7, the battery array modules in the reconfigurable battery array 110 (shown in FIG. 2) of the embodiment are, for example, general dry batteries 304, lead-acid batteries 306, a battery array (composed of various batteries) 308, etc. Each of the battery units in the battery module of the embodiment may be the same or different, and may include a second-life battery. When the battery unit is damaged or a performance thereof is reduced, the reconfigurable battery array 110 may reconfigure the battery configuration of the battery array. Therefore, the battery array may be flexibly used through reconfiguration.

Moreover, when the DC-to-AC conversion of the present embodiment is applied to a hybrid power generation system, wind power generation 301 and solar power generation 302 may also be used to perform the DC-to-AC conversion, and in addition to providing power to the load, excess power may charge the reconfigurable battery array 110. When the wind power generation 301 and the solar power generation 302 are smaller than a demand of the load, the reconfigurable battery array 110 may also discharge for complement.

Moreover, as shown in FIG. 7, through the aforementioned DC-to-AC conversion, the reconfigurable battery array 110 may convert a DC voltage generated by the battery array into a single-phase AC voltage, or may also combine three generated single-phase AC voltages into one three-phase AC voltage. The aforementioned descriptions may be referred for synthesization of the single-phase and three-phase AC voltages. The generated AC voltages may be provided to the load, or the three-phase AC voltages may be tied to the grid. Conversely, if the voltage of the grid is larger, the battery modules of the reconfigurable battery array 110 may also be reversely charged according to the above mechanism. Moreover, the generated three-phase AC voltages may also be synthesized to scale the AC power.

Therefore, the embodiment may be bidirectional in application, i.e. the concept of charging and discharging. Through the framework of the disclosure, the power generated by the reconfigurable battery array 110 may be flexibly utilized between DC, AC and powers of different magnitudes. Moreover, the source of the battery units constituting the battery modules may be diversified, such as second-life batteries, etc., and since the battery modules may adopt different battery units, the cost may be further reduced, and the structure may be more simplified.

In summary, according to the three-phase expandable AC system based on battery reconfiguration and the control method thereof of the embodiment of the disclosure, the battery modules of the reconfigurable battery array are adapted to the existing battery modules, so that the cost is relatively low. The batteries of the battery modules may be mixed with or use the second-life batteries. Moreover, by using the reconfigurable battery array, the direct current may be directly synthesized to the alternating current without suing a complicated voltage conversion circuit. Moreover, the disclosure may use the single-phase AC voltages generated by the reconfigurable battery array to synthesize the three-phase AC voltage without using a complicated inverter circuit, which reduces the cost and simplifies the system operation. Moreover, the generated three-phase AC voltage may be provided to the load, or may be tied to the grid. In addition, the reconfigurable battery array of the disclosure may produce a plurality of three-phase AC voltages, and the three-phase AC voltages may be connected in parallel to implement power scale.

Therefore, through the framework of the disclosure, the system of the disclosure may be flexibly utilized between DC, AC and powers of different magnitudes, so that it has better electricity utilization elasticity. Moreover, the system construction cost may be reduced, and the stress of key components may also be reduced, and the efficiency of power conversion may be effectively improved. In addition, the control of the battery modules of the reconfigurable battery array adopts the hierarchical structure, which may easily synthesize the required voltage and current. Therefore, the embodiment may provide better electricity utilization elasticity, i.e., elastic use of DC, AC power (single-phase and three-phase) and power scale, etc.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:
1. A three-phase expandable AC system based on battery reconfiguration, comprising:
   a reconfigurable battery array, capable of connecting to a load or being tied to a grid, and having a plurality of battery array modules, wherein the reconfigurable battery array performs discharging to the load or the grid, or makes the load or the grid perform charging to the reconfigurable battery array, wherein the reconfigurable battery array performs one of operations comprising:

respectively generating a single-phase AC voltage corresponding to outputs of the battery array modules;

selecting three from the battery array modules to generate a corresponding three-phase AC voltage; and generating a plurality of three-phase AC voltages from the battery array modules, and merging the three-phase AC voltages in parallel to scale power, wherein generating the single-phase AC voltage comprises:

performing battery configuration control on each of the battery array modules to generate a multi-level DC voltage;

superimposing the multi-level DC voltage with an output signal generated by a current command to generate a full-wave DC signal; and converting the full-wave DC signal into the single-phase AC voltage through a polarity converter.

2. The three-phase expandable AC system based on battery reconfiguration as claimed in claim 1, wherein when the reconfigurable battery array is a stand along type reconfigurable battery array, generating the three-phase AC voltage comprises:

selecting one of three corresponding single-phase AC voltages generated by the selected three battery array modules as a master single-phase AC voltage, and taking other two as slave single-phase AC voltages;

taking a phase of the master single-phase AC voltage as a reference, and making phases of the two slave single-phase AC voltages respectively ahead and behind the phase of the master single-phase AC voltage, so as to generate the three-phase AC voltage that is independently operated; and providing the three-phase AC voltage to the load, or tying the three-phase AC voltage to the grid.

3. The three-phase expandable AC system based on battery reconfiguration as claimed in claim 1, wherein when the reconfigurable battery array is a grid-tied type reconfigurable battery array, generating the three-phase AC voltage comprises:

taking three corresponding single-phase AC voltages generated by the selected three battery array modules as three slave single-phase AC voltages; and respectively synchronizing with three phases of the grid to tie the three single-phase AC voltages to the grid.

4. The three-phase expandable AC system based on battery reconfiguration as claimed in claim 1, wherein the battery array modules respectively comprise:

a plurality of battery modules;

a current mode switch converter, connected to one end of the battery modules, receiving a current command, and controlling the battery array module to perform the charging or the discharging; and a battery configuration control portion, connected to the battery modules, and configured to set each of the battery modules to an enable mode or a bypass mode according to a required voltage output.

5. The three-phase expandable AC system based on battery reconfiguration as claimed in claim 4, wherein the battery modules are arranged to be connected in series and parallel to form the battery array module.

6. The three-phase expandable AC system based on battery reconfiguration as claimed in claim 1, wherein each of the battery array modules comprises a plurality of battery modules, and the battery modules are respectively second-life batteries.

7. The three-phase expandable AC system based on battery reconfiguration as claimed in claim 6, wherein a specification of each of the battery modules is the same or different.

8. The three-phase expandable AC system based on battery reconfiguration as claimed in claim 1, wherein the reconfigurable battery array directly outputs a DC voltage as required.

9. A control method of a three-phase expandable AC system based on battery reconfiguration, wherein the three-phase expandable AC system based on battery reconfiguration comprises a reconfigurable battery array capable of connecting to a load or being tied to a grid, and the reconfigurable battery array has a plurality of battery array modules, the control method comprising:

performing discharging to the load or the grid by the reconfigurable battery array, or making the load or the grid perform charging to the reconfigurable battery array, wherein the reconfigurable battery array performs one of operations comprising:

respectively generating a single-phase AC voltage corresponding to outputs of the battery array modules;

selecting three from the battery array modules to generate a corresponding three-phase AC voltage; and generating a plurality of three-phase AC voltages from the battery array modules, and merging the three-phase AC voltages in parallel to scale power, wherein generating the single-phase AC voltage comprises:

performing battery configuration control on each of the battery array modules to generate a multi-level DC voltage;

superimposing the multi-level DC voltage with an output signal generated by a current command to generate a full-wave DC signal; and performing polarity conversion to convert the full-wave DC signal into the single-phase AC voltage.

10. The control method of the three-phase expandable AC system based on the battery reconfiguration as claimed in claim 9, wherein when the reconfigurable battery array is a stand along type reconfigurable battery array, generating the three-phase AC voltage further comprises:

selecting one of three corresponding single-phase AC voltages generated by the selected three battery array modules as a master single-phase AC voltage, and taking other two as slave single-phase AC voltages;

taking a phase of the master single-phase AC voltage as a reference, and making phases of the two slave single-phase AC voltages respectively ahead and behind the phase of the master single-phase AC voltage, so as to generate the three-phase AC voltage that is independently operated; and providing the three-phase AC voltage to the load, or tying the three-phase AC voltage to the grid.

11. The control method of the three-phase expandable AC system based on the battery reconfiguration as claimed in claim 9, wherein when the reconfigurable battery array is a grid-tied type reconfigurable battery array, generating the three-phase AC voltage further comprises:

taking three corresponding single-phase AC voltages generated by the selected three battery array modules as three slave single-phase AC voltages; and
respectively synchronizing with three phases of the grid to tie the three single-phase AC voltages to the grid.

12. The control method of the three-phase expandable AC system based on the battery reconfiguration as claimed in claim 9, wherein the reconfigurable battery array performs the discharging or the charging based on a current command.

13. The control method of the three-phase expandable AC system based on the battery reconfiguration as claimed in claim 9, wherein each of the battery array modules comprises a plurality of battery modules, and the battery modules are respectively second-life batteries.

14. The control method of the three-phase expandable AC system based on the battery reconfiguration as claimed in claim 13, wherein a specification of each of the battery modules is the same or different.

15. The control method of the three-phase expandable AC system based on the battery reconfiguration as claimed in claim 13, wherein the battery modules are arranged to be connected in series and parallel to form the battery array module.

16. The control method of the three-phase expandable AC system based on the battery reconfiguration as claimed in claim 9, wherein the reconfigurable battery array directly outputs a DC voltage as required.

* * * * *